Figure 1:
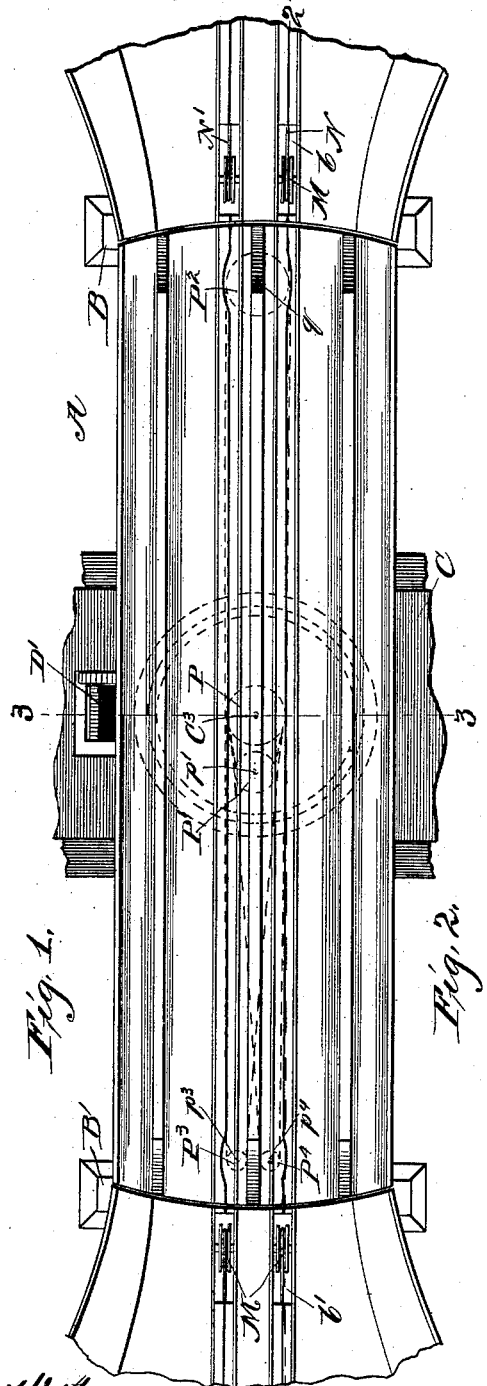

(No Model.) 6 Sheets—Sheet 1.

W. C. METZNER & G. E. BUSCHICK.
CABLE RAILWAY.

No. 468,813. Patented Feb. 16, 1892.

Witnesses
W. C. Corlies
Martin H. Olsen

Inventors
William C. Metzner
Gustavus E. Buschick
By Geo. W. LeVin, Atty.

(No Model.) 6 Sheets—Sheet 3.
W. C. METZNER & G. E. BUSCHICK.
CABLE RAILWAY.

No. 468,813. Patented Feb. 16, 1892.

Witnesses
W. E. Coolis
Martin H. Olsen

Inventors
William C. Metzner
Gustavus E. Buschick
By Geo. W. Levin, Atty.

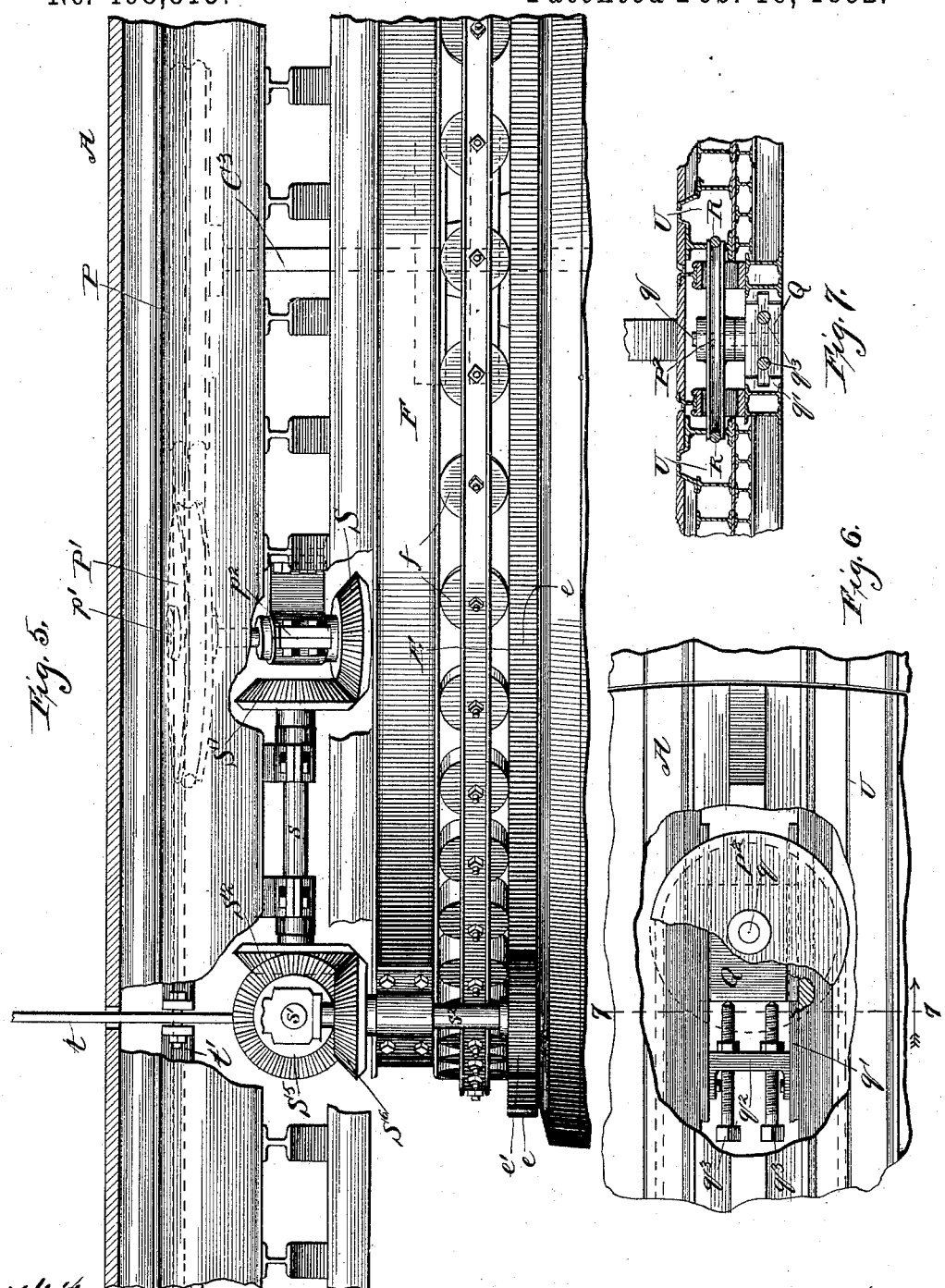

(No Model.) 6 Sheets—Sheet 5.
W. C. METZNER & G. E. BUSCHICK.
CABLE RAILWAY.
No. 468,813. Patented Feb. 16, 1892.
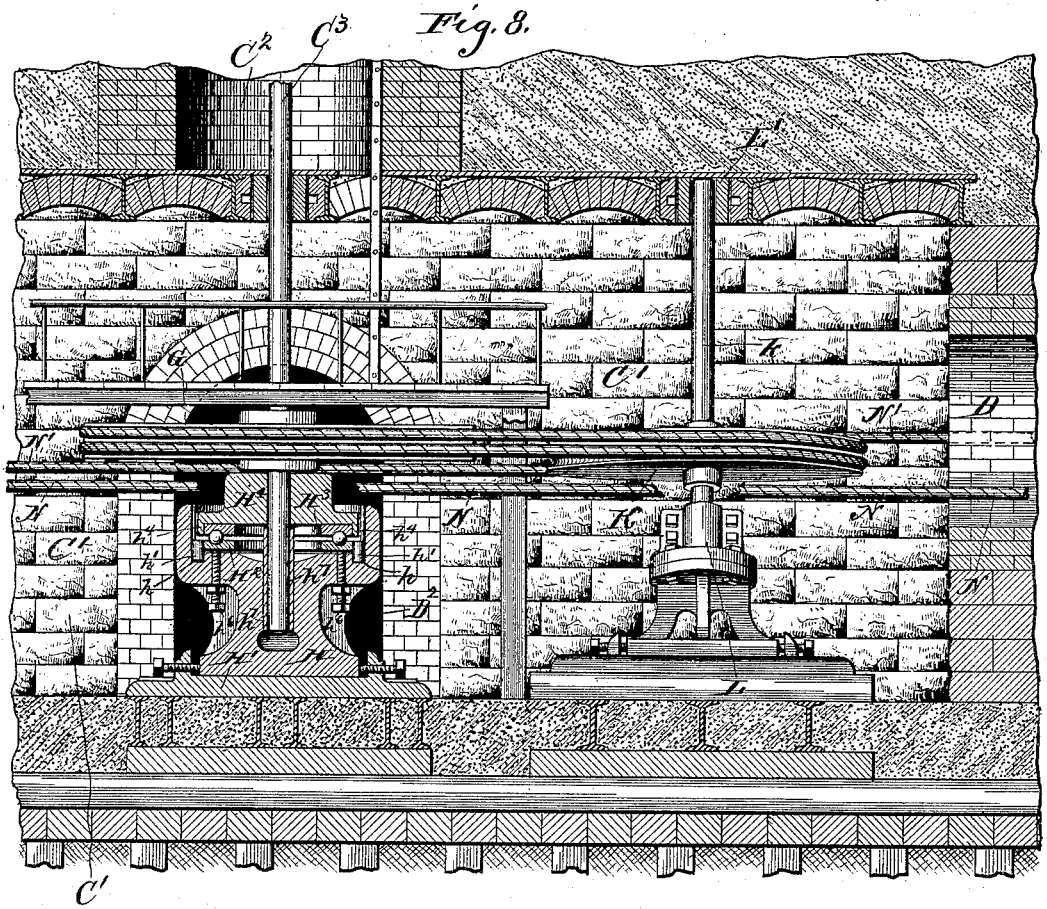
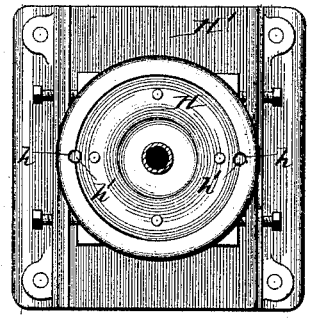
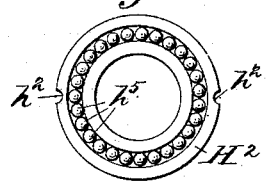
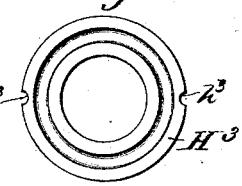
Witnesses
W. C. Coolies
Martin H. Olsen
Inventors
William C. Metzner
Gustavus E. Buschick
By Geo. W. Levin Atty.

(No Model.) 6 Sheets—Sheet 6.

W. C. METZNER & G. E. BUSCHICK.
CABLE RAILWAY.

No. 468,813. Patented Feb. 16, 1892.

Witnesses
W. C. Coles
Martin H. Olsen.

Inventors
William C. Metzner
Gustavus E. Buschick
By Geo. W. LeVin, Atty.

THE NORRIS PETERS CO., PHOTO-LITHO., WASHINGTON, D. C.

UNITED STATES PATENT OFFICE.

WILLIAM C. METZNER AND GUSTAVUS E. BUSCHICK, OF CHICAGO, ILLINOIS.

CABLE RAILWAY.

SPECIFICATION forming part of Letters Patent No. 468,813, dated February 16, 1892.

Application filed August 19, 1891. Serial No. 403,123. (No model.)

*To all whom it may concern:*

Be it known that we, WILLIAM C. METZNER and GUSTAVUS E. BUSCHICK, citizens of the United States, residing at Chicago, in the county of Cook and State of Illinois, have invented certain new and useful Improvements in Cable Railways, of which the following is a full, clear, and exact description, reference being had to the accompanying drawings, and to the letters of reference marked thereon, which form part of this specification.

Our invention relates to improvements in cable-railway systems of the class wherein the route or line of road is intersected by a stream, requiring the employment of a swing-bridge, its purpose being, first, to provide means whereby the cars of the system may, with facility and without complication or delay, pass from the main cable over the swing-bridge to engagement with the main cable on the opposite side of the bridge; secondly, to provide means whereby a swing-bridge forming part of or being within the line of a cable railway may be manipulated through its operations of opening and closure by means of the main cable of the system.

To these ends the invention, in the main, embraces, first, an auxiliary cable carried by the bridge, a suitable subway or cable-passage projected beneath the river from one or both abutments of the bridge to the center or bridge pier, a vault formed within said pier into which the subway or cable-passage opens, and a shaft projected from said vault upwardly to the bridge, adapted by its upper end to communicate motion to the auxiliary or bridge-cable, and by its lower end, situate within said vault, to be driven by the main cable which passes thereto from the main or surface line through said subway; secondly, a system of gearing carried by the bridge and operated directly or indirectly through said shaft by means of the main cable, operative to swing the bridge as may be desired to its positions of opening or closure.

The invention further embraces novel and useful features of construction and arrangement, all of which are shown in the drawings, hereinafter fully described, and pointed out in the appended claims.

Figure 2:
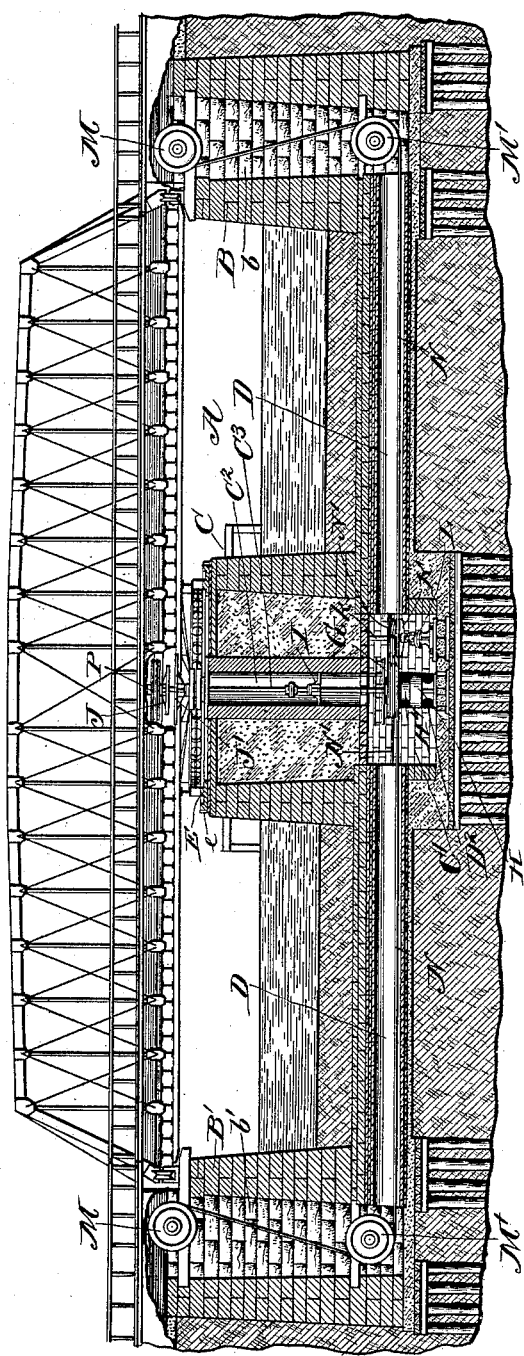
Figure 3:
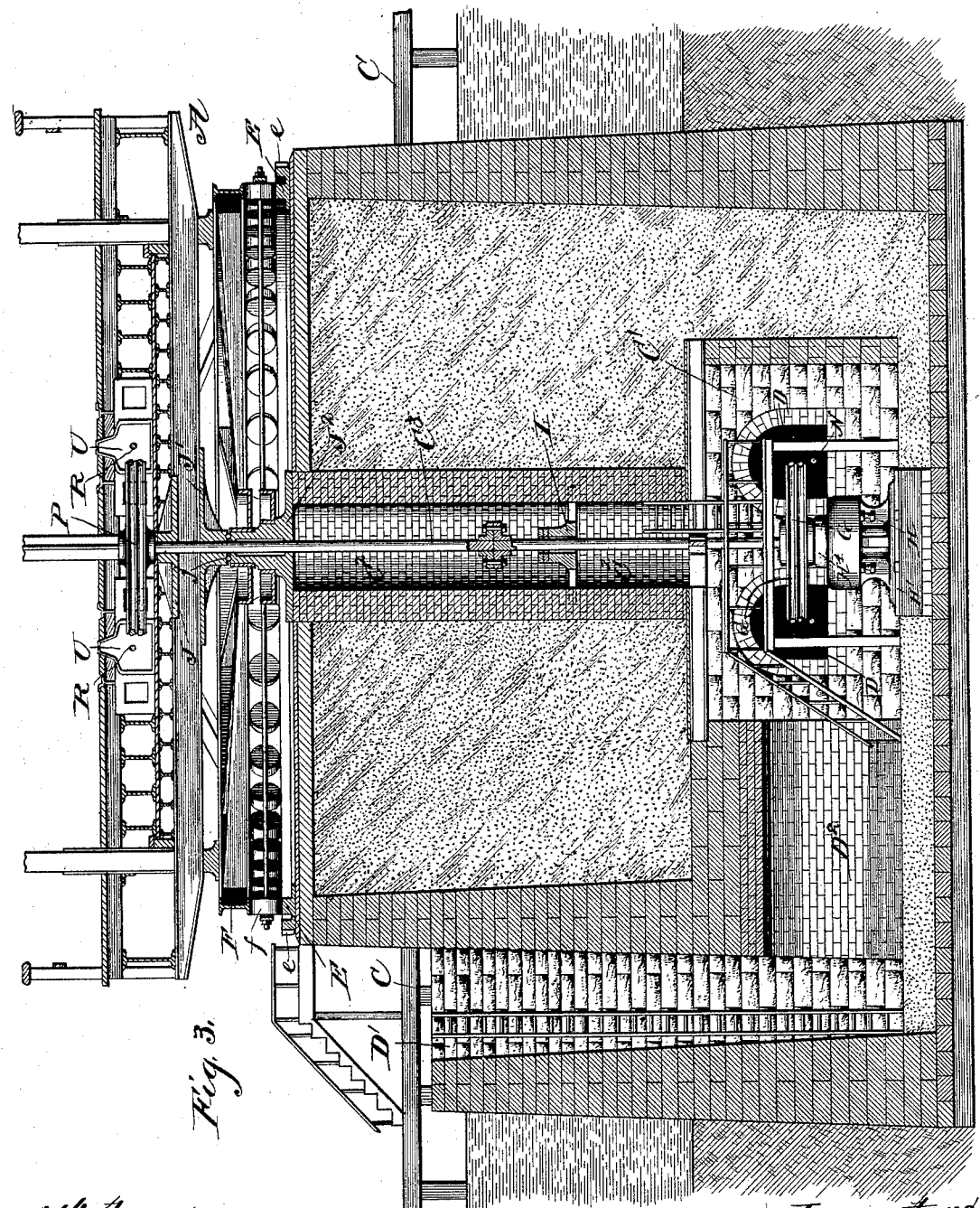
Figure 4:
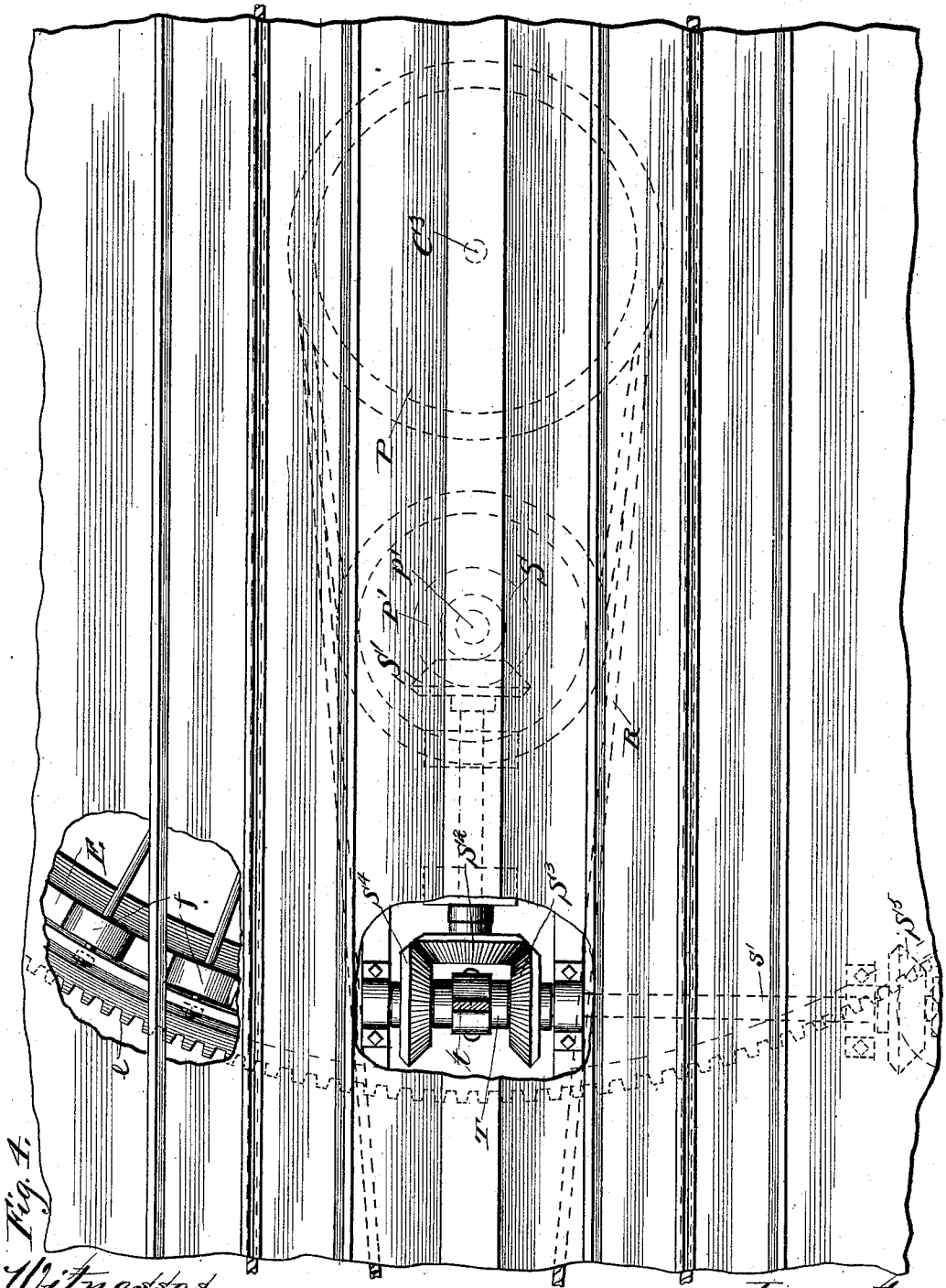

In the drawings, Figure 1 is a top plan view of a swing-bridge, with its center pier and abutments, embodying our improvements, the superstructure of the bridge not being shown. Fig. 2 is a view, mainly in longitudinal section, taken on the line 2 2 of Fig. 1, the bridge, except where broken away to show the center or auxiliary-cable driving-wheel, being in elevation. Fig. 3 is a transverse section of the center pier and lower portion of the bridge, taken on the line 3 3 of Fig. 1, the vertical shaft carrying the driven and driving cable-wheels and the lower bearing therefor being shown in elevation. Fig. 4 is a broken top plan detail mainly intended to illustrate the central portion of the bridge and the devices which we employ for swinging the same. Fig. 5 is a detail in side elevation showing portions of the center pier, turn-table, and bridge, the latter being in part broken away to further show the operative arrangement of the bridge-turning mechanism. Fig. 6 is a broken top plan detail showing the auxiliary-cable tension-wheel and the devices employed in conjunction therewith for taking up the slack of the auxiliary cable. Fig. 7 is a detail, mainly in cross-section, taken upon the line 7 7 of Fig. 6, further showing the operative arrangement of said tension-wheel, the view being in the direction indicated by the arrow shown in said Fig. 6. Fig. 8 is an enlarged detail, mainly in vertical section, taken through the center-pier vault and the subway opening therein, showing the lower portion of the auxiliary-cable driving-shaft, the lower bearing therefor, the driven cable-wheel fixed to said shaft, the idler cable-wheel and its shaft and bearings operative in conjunction with the driven wheel, also the in and out going cables. Fig. 9 is an enlarged top plan view of the lower bearing for the auxiliary-cable driving-shaft and the sole-plate carrying said bearing. Fig. 10 is a top plan view of a grooved steel ring fixedly held by the main or lower bearing for the auxiliary-cable driving-shaft, carrying steel balls forming part of anti-friction mechanism provided to take the downward thrust of said driving-shaft. Fig. 11 is a bottom plan view of a grooved steel ring which works over the steel balls carried by the ring shown in Fig. 10, being operatively held to a shoe fixed to the auxiliary-cable driving-shaft below the driven cable-wheel fixed thereto.

Figure 12:
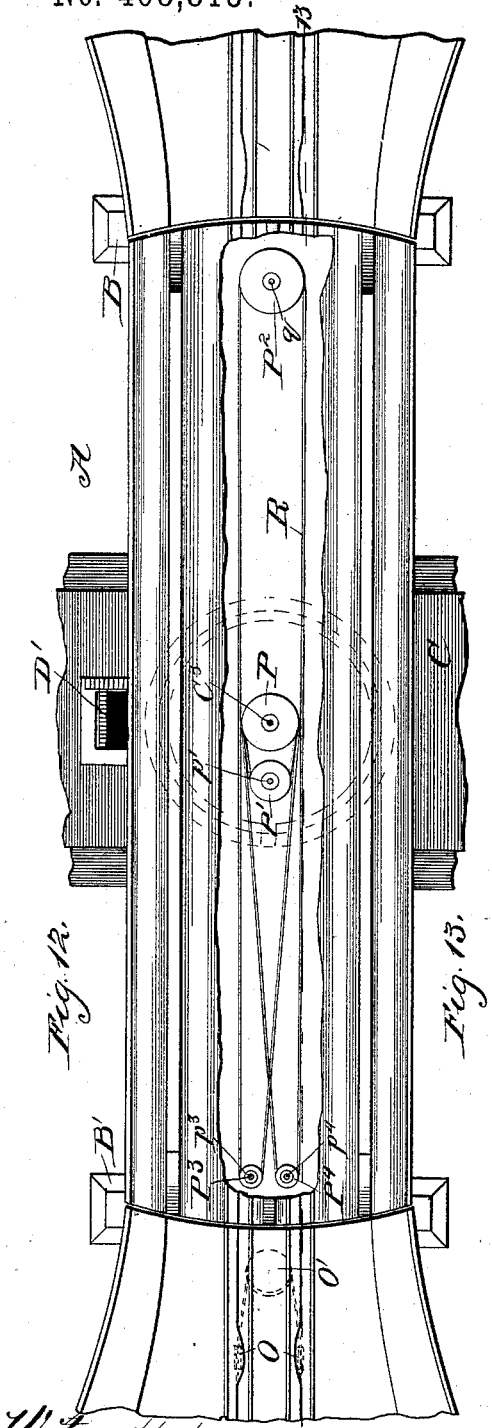
Figure 13:
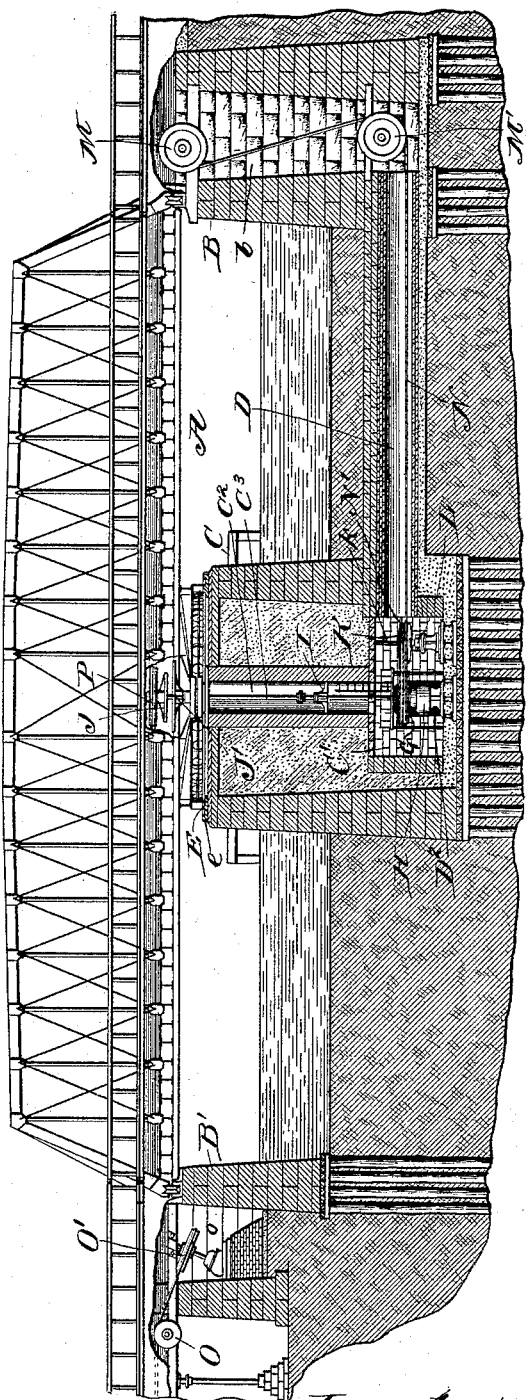

Fig. 12 is a top plan view, in part broken away, of a swing-bridge, its center pier, and abutments, showing in full lines the operative arrangement of the auxiliary cable. Fig. 13 is a view, mainly in longitudinal section, taken on the line 13 13 of Fig. 12, the bridge being shown in elevation, except where broken away to show the auxiliary-cable driving-wheel, the said view showing the main cable as passing to the auxiliary-cable driving-wheel through a subway extended to the center pier from one side of the river only, an additional main cable operating from the other side of the river completing the system.

To more particularly describe the details of construction and arrangement shown, A indicates the swing-bridge; B B', the abutments; C, the center pier; C', a vault formed within the center pier; $C^2$, a vertical opening extending upwardly through the center pier from the vault C'; D', a vertical opening formed in the side of the pier; $D^2$, a horizontal passage extending from said vertical opening to the pier-vault, and D a two-compartment subway connecting said vault with vaults $b\ b'$, provided in the several abutments (shown particularly in Fig. 2) or with the abutment-vault $b$. (Shown in Fig. 13.)

E is a trackway located on top of the center pier, and F a turn-table frame attached to the bridge, working on track-wheels $f$. $C^3$ indicates a vertical shaft projected upwardly from the chamber C', through the vertical opening $C^2$, to the bridge A, carrying at its upper end a grooved cable-wheel P and near its lower end a grooved cable-wheel G. The said shaft works in bearings H, I, J, J', and $J^2$, respectively, located within the vault C', within the vertical opening therefrom $C^2$ upon the bridge and at the upper end of said opening $C^2$.

K is an idler cable-wheel located within vault C', adjacent to the wheel G, and $k$ its shaft sustained at a suitably-operative angle to the axis of said wheel G in upper and lower bearings L L'.

M M' are vertical angle-wheels located, respectively, in the upper and lower portions of the abutment vaults or vault, (see Figs. 2 and 13,) provided for guiding the cable from the road-bed of the system to and through the subway to connection with and from the wheel G, carried by the vertical shaft $C^3$.

N N' indicates the outgoing and ingoing portions of the main cable, respectively.

In practice the subway D would be provided with cable-carrier wheels, which we have not considered necessary to show in the drawings.

O', Fig. 13, refers to an angularly-pitched cable-terminal wheel located in a chamber $o$ provided in abutment B', adjacent to terminal cable-carrier wheels O, such arrangement being advantageous when it is necessary or desirable to employ two main cables in the system in contradistinction to one, as shown particularly in Figs. 2 and 8.

P', Figs. 1, 4, 5, and 12, is a cable-wheel located upon the bridge A, adjacent to the driving-wheel P, carried by the vertical shaft $C^3$, its shaft $p'$ being sustained at a suitably-operative angle to the axis of the wheel P in a bearing indicated by $p^2$.

$P^2$ is a loose cable-carrying tension-wheel located at or near one end of the bridge; $P^3$ $P^4$, loose horizontal angle-wheels working upon fixed axles $p^3\ p^4$ and taking the auxiliary cable R at or near the opposite end of the bridge to and from the driving-wheel P, to and from the tension-wheel $P^2$, and U the auxiliary-cable conduit. The spindle $q$, upon which the tension-wheel $P^2$ works, is fixed to or forms part of a sliding block Q, Figs. 6 and 7, longitudinally adjustable in lateral guides $q'\ q'$, fixed to the substructure of the bridge, the block being manipulated to carry the wheel to position necessary to give proper tension to the cable, which it carries by means of adjusting-screws $q^3\ q^3$, working through a nut $q^2$, desirably fixed to the guides, as shown.

S (see Figs. 4 and 5) is a miter-gear fixed to the lower end of the shaft $p'$ of the auxiliary cable-wheel P'; S', a miter-gear fixed to the horizontal shaft $s$ and meshing with said gear S, and $S^2$ a miter-gear fixed to the outer end of the shaft $s$.

$S^3\ S^4$ are loose miter-gears carried by shaft $s'$ and held in constant engagement with the gear $S^2$.

$S^5$ is a miter-gear fixed to the outer end of the shaft $s'$, and $S^6\ e'$ a miter-gear and pinion fixed, respectively, to the upper and lower ends of a vertical shaft $s^2$, the former meshing with the gear $S^5$ and the latter meshing with an ordinary annular rack or gear fixed to the bridge-pier.

T is a friction-clutch working longitudinally on the shaft $s'$ between the gears $S^3\ S^4$ on splines, (not deemed necessary to be shown;) $t$, the clutch-lever, and $t'$ the bearing to which the lever is pivoted.

Recurring to the lower anti-friction or thrust bearing for the vertical shaft $C^3$, (fully illustrated in Figs. 8, 9, 10, and 11,) the main bearing H consists of a casting, preferably circular in form, rimmed or cup-shaped at its upper end, and held by a sole-plate H', secured to the floor of the pier-vault, the center of the casting being suitably bored and carrying a brass shell $h^7$, within which the shaft works. In the bottom of the cup-shaped portion of the casting is located a steel ring $H^2$, held in position as against axial movement by keys $h'$, which fit within grooves $h^2$, formed in the perimeter of the ring and recesses $h$, provided in the casting. The ring is provided in its upper face with an annular groove which carries steel balls $h^5$ and is adjusted to a perfect horizontal plane by means of adjusting-screws $h^6$, which, working upwardly through the casting, impinge against its lower face. Above the ring $H^2$ is preferably located a similar steel ring H³, provided in its under face with an annular groove intended to work over the balls $h^5$, being held to a shoe or distance-plate H⁴, fixed to the shaft C³ and rotative therewith below the cable-wheel G by means, desirably, of lugs $h^4$, forming part of the shoe, which fit in grooves $h^3$, formed in the perimeter of the rim. In operation the cup-shaped portion of the bearing is kept constantly filled with a suitable lubricant. If desired, the ring H³ may be dispensed with and the distance-plate H⁴ arranged to similarly work upon the balls $h^5$. Between corresponding faces of the bearings J² and J′, located, respectively, on the pier and bridge, are interposed steel balls $j$, likewise intended to reduce the friction incident to the swinging operation of the bridge.

The auxiliary cable R passes from the tension-wheel P² to the angle-wheel P³, thence to and around the driving-wheel P, carried by the shaft C³, thence to and around wheel P′, thence to and again around wheel P, thence to and around angle-wheel P⁴, thence back to tension-wheel P².

The operative arrangement of a cable-railway system embodying our improvements—the arrangement being as shown in the general view, Fig. 2—is as follows: The outgoing cable (marked N) passes from the main line over and under the angle-wheels M M′, respectively, in the vault $b'$ of abutment B′; thence through one compartment of the subway to and through the center-pier vault; thence through the subway to vault $b$ in abutment B, under angle-wheel M′ and over angle-wheel M to the surface-conduit; thence to the line-terminal, from which it returns (marked N′) to the abutment B, passing over an angle-wheel M and under an angle-wheel M′ in the vault $b$, thence through the other subway-compartment to the center-pier vault, passing around the cable-wheel G, fixed to the shaft C³; thence around the idler K; thence back to and around wheel G; thence again around idler K; thence through the vault and subway to and under angle-wheel M′ and over angle-wheel M in vault $b'$ of abutment B′ to the surface-conduit, and thence to the source of power. The main cable being in motion and the shaft C³ being necessarily rotated thereby, it is evident that motion is given to the auxiliary cable R, through the driving-wheel P, fixed to the upper end of the shaft C³; also, that motion is communicated from the shaft $p^2$ of the continuously-moving cable-wheel P′ through the miter-gears S S′, shaft $s$, and miter-gear S² to the loose miter-gears S³ S⁴, and therefore when the clutch T is thrown into engagement with either of the gears S³ S⁴ right or left motion is imparted through the shaft $s'$, gears S⁵ S⁶, and shaft $s^2$ to pinion $c'$, causing the bridge to swing in either direction intended.

While in Fig. 13 the wheels G K are shown to be provided with three peripheral cable-grooves and in the other figures said wheels are shown to be provided each with but two grooves, we wish to be understood as not limiting ourselves to any exact details of construction in this particular, as the several views simply illustrate our preferred forms of construction, which also applies to the construction in the same particular of the auxiliary-cable wheels P P′. It may be noted also that the term "main cable" employed herein is fully intended to embrace any loop or cable auxiliary to the main cable and forming part of the main line necessary to the operation of our improvements in the manner substantially shown and described.

Having thus comprehensively set forth our invention, we claim and desire to secure by Letters Patent—

1. In a cable railway, the combination, with the main cable, a swing-bridge, and an auxiliary cable carried thereby, of a subway or cable-passage projected beneath the river from one or both abutments of the bridge to the center or bridge pier, a vault formed within said pier into which the subway or cable-passage opens, and a shaft projected from said vault upwardly to the bridge, adapted by its upper end to communicate motion to the auxiliary or bridge cable and by its lower end situate within said vault to be driven by the main cable, which passes thereto from the main or surface line through said subway, substantially as described.

2. In a cable railway, the combination, with the main cable, a swing-bridge, and an auxiliary cable carried thereby, of a subway or cable-passage projected beneath the river from one or both abutments of the bridge to the center pier, a vault or working chamber formed in the pier into which the subway opens, a shaft located within said pier, projected upwardly from said vault to the bridge, a cable-wheel fixed to the upper end of said shaft, connected with and adapted to give motion to the auxiliary cable, and a cable-wheel fixed to the lower end of said shaft, arranged and adapted to be driven by the main cable which passes from the main line through said subway, substantially as described.

3. In a cable railway, the combination, with the main cable, a swing-bridge, and an auxiliary cable carried thereby, of a vault or working chamber formed within the bridge-pier, a subway or cable-passage projected beneath the river from one or both abutments of the bridge in connection with said vault, a shaft located within the pier, projected upwardly from said vault to the bridge, carrying at or about its upper end a cable-wheel having operative connection with the auxiliary cable and at or about its lower end a cable-wheel arranged and adapted to be driven by the main cable which enters thereto to said subway, and an idler cable-wheel located adjacent to said shaft adapted to receive the main cable from the lower wheel on said shaft and guide the same back thereto, substantially as set forth.

4. In a cable railway, the combination, with the main cable, a swing-bridge, and an auxiliary cable carried thereby, of a subway or cable-passage projected beneath the river from one or both abutments of the bridge to the center pier, a vault or chamber within the center pier in which the subway opens, a shaft projected upwardly from said vault to the bridge, adapted by its upper end to communicate motion to the auxiliary cable and by its lower end to be driven by the main cable which enters thereto through the subway from the surface line, snd a system of clutch-operated gearing carried by the bridge and given motion through said upwardly-projected cable-driven shaft, adapted to swing the bridge to positions of opening or closure, substantially as described.

5. The combination, with the cable-driven shaft $C^3$, the auxiliary-cable driving-wheel P, carried thereby, the auxiliary-cable wheels P′ $P^3$ $P^4$, and the cable R, of the tension-wheel $P^2$ and devices for moving the same so as to give tension to said cable, substantially as described.

6. The combination, with the cable-driven shaft $C^3$, of the main rimmed bearing H, the grooved ball-carrying ring $H^2$, the devices for adjusting the same upon a horizontal plane, the balls $h^5$, the upper grooved ring $H^3$, and the shoe H′, all arranged with relation to each other and operating substantially as and for the purpose described.

WILLIAM C. METZNER.
GUSTAVUS E. BUSCHICK.

Witnesses:
GEO. W. LEVIN,
OTTO HOLINGER.